(12) United States Patent
Arsenault et al.

(10) Patent No.: US 11,694,044 B2
(45) Date of Patent: Jul. 4, 2023

(54) ORE TAG ASSEMBLY AND SYSTEM AND METHOD RE SAME

(71) Applicant: TopVu Ltd., Sudbury (CA)

(72) Inventors: Gilles Arsenault, Lively (CA); Yvan Brule, Blind River (CA); Patrick Clement, Sudbury (CA)

(73) Assignee: Topvu Ltd., Sudbury (CA)

( * ) Notice: Subject to any disclaimer, the term of this patent is extended or adjusted under 35 U.S.C. 154(b) by 330 days.

(21) Appl. No.: 16/574,543

(22) Filed: Sep. 18, 2019

(65) Prior Publication Data

US 2020/0089923 A1 Mar. 19, 2020

(30) Foreign Application Priority Data

Sep. 18, 2018 (CA) ..................................... 3017675

(51) Int. Cl.
*G06K 7/10* (2006.01)
*G06K 19/07* (2006.01)

(52) U.S. Cl.
CPC ..... *G06K 7/10366* (2013.01); *G06K 19/0723* (2013.01)

(58) Field of Classification Search
CPC .. G06K 7/10366; G06K 19/0723; G06K 7/10; G06K 19/07; E21C 41/00
USPC ..... 340/13.26; 235/488, 492, 383, 384, 375, 235/472.01
See application file for complete search history.

(56) References Cited

U.S. PATENT DOCUMENTS

| | | | |
|---|---|---|---|
| 7,047,103 B2 | 5/2006 | Hornbaker et al. | |
| 7,061,382 B2 * | 6/2006 | Claessens | G06Q 20/207 340/572.8 |
| 7,162,328 B2 | 1/2007 | Hornbaker et al. | |
| 7,378,965 B2 * | 5/2008 | Oakes | B65C 9/28 156/238 |
| 7,511,618 B2 | 3/2009 | Hornbaker et al. | |
| 7,728,733 B2 | 6/2010 | Baba et al. | |
| 8,573,501 B2 * | 11/2013 | Whiteman | G06K 19/07749 235/488 |
| 8,810,406 B2 * | 8/2014 | Sell | G06Q 50/02 340/572.8 |
| 8,854,212 B2 | 10/2014 | Goidas et al. | |
| 9,262,657 B2 | 2/2016 | Goidas et al. | |

(Continued)

FOREIGN PATENT DOCUMENTS

| | | |
|---|---|---|
| AU | 2003200413 A1 | 8/2003 |
| AU | 2017213568 B1 | 9/2018 |

(Continued)

OTHER PUBLICATIONS

Machine-generated English translation of the Abstract of JP Patent No. 5381933, Nagano et al.

(Continued)

*Primary Examiner* — Nam V Nguyen
(74) *Attorney, Agent, or Firm* — Carlson, Gaskey & Olds, P.C.

(57) ABSTRACT

An ore tag assembly including a tube subassembly having one or more tubes extending between first and second ends thereof and defining a cavity therein, and a RFID device located in the cavity. The ore tag assembly includes plugs positioned in the respective first and second ends of one of the tubes, to prevent ingress of liquids or other materials into the cavity.

10 Claims, 9 Drawing Sheets

(56) References Cited

U.S. PATENT DOCUMENTS

| | | | |
|---|---|---|---|
| 9,349,112 B2* | 5/2016 | Gazdzinski | G06Q 10/0832 |
| 10,346,656 B2 | 7/2019 | Wilkinson | |
| 2007/0103315 A1 | 5/2007 | Geissler | |
| 2009/0209849 A1* | 8/2009 | Rowe | A61B 5/06 |
| | | | 600/424 |
| 2010/0032486 A1* | 2/2010 | Tasaki | A61D 19/024 |
| | | | 235/492 |
| 2010/0102967 A1* | 4/2010 | Lee | B65D 51/245 |
| | | | 340/572.8 |
| 2016/0332199 A1* | 11/2016 | Schuetz | G08B 21/18 |
| 2018/0086533 A1* | 3/2018 | Kjelland | G06K 19/07749 |
| 2019/0000073 A1* | 1/2019 | Pedersen | G06K 19/07 |
| 2019/0181917 A1 | 6/2019 | Quintrell | |
| 2019/0205712 A1 | 7/2019 | Dong et al. | |

FOREIGN PATENT DOCUMENTS

| | | |
|---|---|---|
| CA | 2682753 A1 | 10/2008 |
| CA | 2856830 A1 | 1/2015 |
| JP | 201070286 A | 4/2010 |
| JP | 5381933 B2 | 1/2014 |
| WO | 2018015783 A1 | 1/2018 |

OTHER PUBLICATIONS

Machine-generated English translation of the Abstract of JP Patent Application No. 2010-70286, Cho et al.

\* cited by examiner

ORE TAG ASSEMBLY AND SYSTEM AND METHOD RE SAME

FIELD OF THE INVENTION

The present invention is an ore tag assembly and a system including same, and a method of using the system.

BACKGROUND OF THE INVENTION

As is well known in the art, attempts have been made to develop "ore markers" that include devices, such as RFID tags, that can be used to identify where, in a mine, a quantity of ore came from. This information can be used in different ways. For example, reliable information regarding the sources of quantities of ore that have been mined can be used to enable the mine operator to control the ore feed to the mill to optimize processing the ore in the mill.

However, the known ore markers are generally unsatisfactory, in different ways. The RFID tag is typically located in a shell that is hard, because it is intended to withstand the significant impact pressures to which the shell is subjected as the ore is moved from a stope or other location in the mine toward the mill. In general, the known RFID marker shells have a high attrition rate, because they are frequently crushed by the ore.

Typically, antennas are positioned at conveyor belts on which the ore is moved, for example, in order to detect the ore markers before the ore reaches the mill. However, the RFID tags frequently are not successfully detected by antennas designed to detect them, because the RFID marker shells that include the RFID tags therein may be, for example, buried in the ore on a conveyor belt.

SUMMARY OF THE INVENTION

There is a need for an ore tag and a system and a method of utilizing same that overcomes or mitigates one or more of the disadvantages or defects of the prior art. Such disadvantages or defects are not necessarily included in those listed above.

In its broad aspect, the invention provides an ore tag assembly including one or more tubes extending between first and second ends thereof and defining a cavity therein, a RFID device located in the cavity, and plugs positioned in the respective first and second ends of the one or more tubes, to prevent ingress of liquids and materials into the cavity.

BRIEF DESCRIPTION OF THE DRAWINGS

The invention will be better understood with reference to the attached drawings in which.

DETAILED DESCRIPTION

Figure 1A:
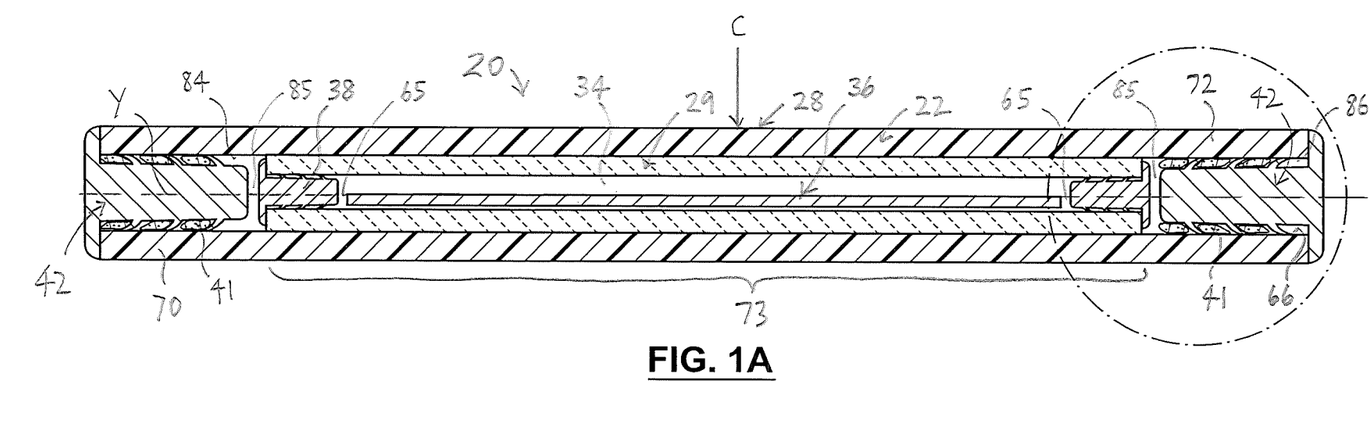
FIG. 1A is a longitudinal cross-section of an embodiment of an ore tag assembly of the invention.
Figure 1B:
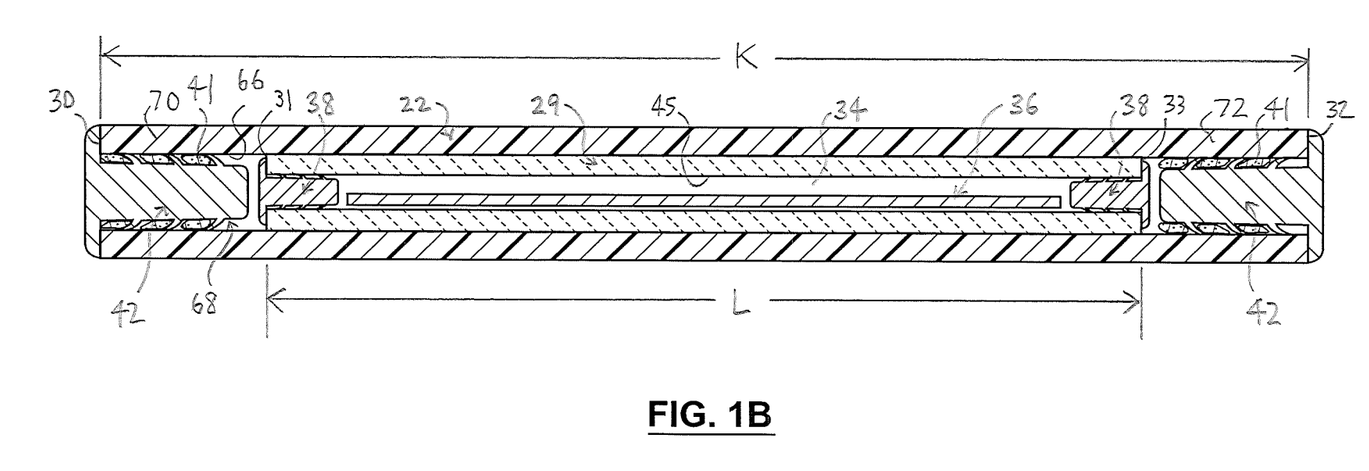
FIG. 1B is another longitudinal cross-section of the ore tag assembly of FIG. 1A.

In the attached drawings, like reference numerals designate corresponding elements throughout. Reference is made to FIGS. 1A-3 to describe an embodiment of an ore tag assembly of the invention indicated generally by the numeral 20. Preferably, the ore tag assembly 20 includes a tube subassembly 28 extending between first and second ends 30, 32 thereof and defining a cavity 34 therein in which a RFID device 36 is located, as will be described (FIGS. 1A, 1B). It is also preferred that the ore tag assembly 20 includes plug elements 42 that are positioned in the respective first and second ends 30, 32 of the tube assembly 28 (FIG. 1A). The plug elements 42 are to prevent or impede ingress of liquids and materials into the cavity 34.

The tube subassembly 28 may include one or more tubes. In one embodiment, as illustrated in FIGS. 1A-3, the tube subassembly 28 preferably includes an outer tube 22 extending between the first and second ends 30, 32 in which an inner tube 29 is received (FIG. 1B). As can be seen in FIG. 1B, the inner tube 29 preferably extends between first and second ends 31, 33 thereof.

It will be understood that the tube subassembly 28 may include any suitable number of tubes, arranged relative to each other in any suitable manner. As will be described, where two tubes are included in the tube subassembly, as illustrated in FIGS. 1A-3, it is preferred that the two tubes are not directly secured to each other.

Figure 1C:
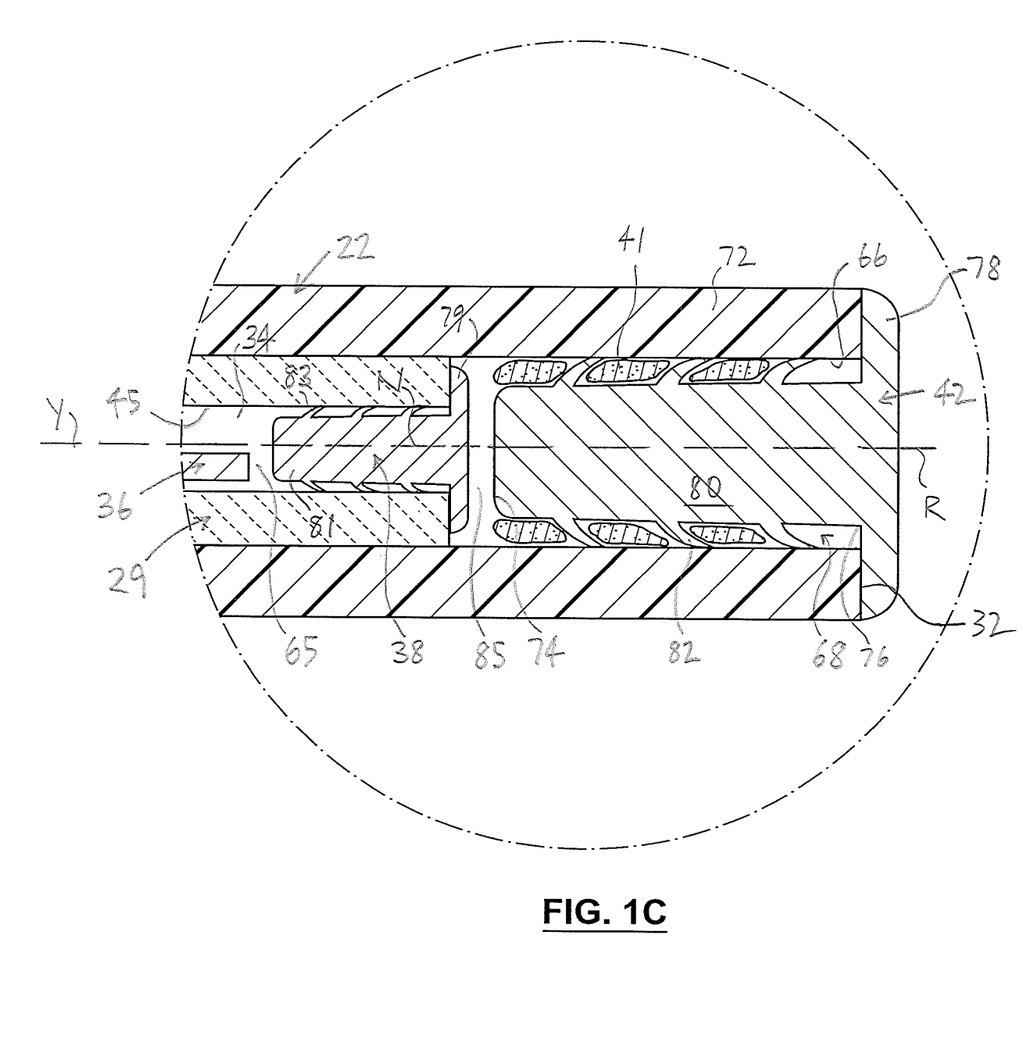
FIG. 1C is a portion of FIG. 1A showing an end of the ore tag assembly of FIG. 1A, drawn at a larger scale.

Preferably, and as can be seen in FIGS. 1A-1C, inner plugs 38 are positioned in the respective first and second ends 31, 33 of the inner tube 29, to at least partially seal the cavity 34.

As will be described, in one embodiment, the ore tag assembly 20 preferably also includes sealant 41 that is positioned in the first and second ends 30, 32 of the tube assembly 28, to provide seals between the plug elements 42 and the outer tube 22. Those skilled in the art would appreciate that the sealant 41 helps to prevent ingress of liquid and material into the cavity 34.

It will be understood that the outer tube 22 and the inner tube 29 may be made of any suitable material, or materials. Preferably, the outer tube 22 and the inner tube 29 are made of one or more materials that are flexible and also generally permit electromagnetic waves at frequencies of interest to pass therethrough, i.e., with minimal interference. Those skilled in the art would be aware of suitable materials. For example, it has been found that high density polyethylene is a suitable material for each of the outer tube 22 and the inner tube 29. It will also be understood that the tubes 22, 29 may be made of different materials.

Figure 3:
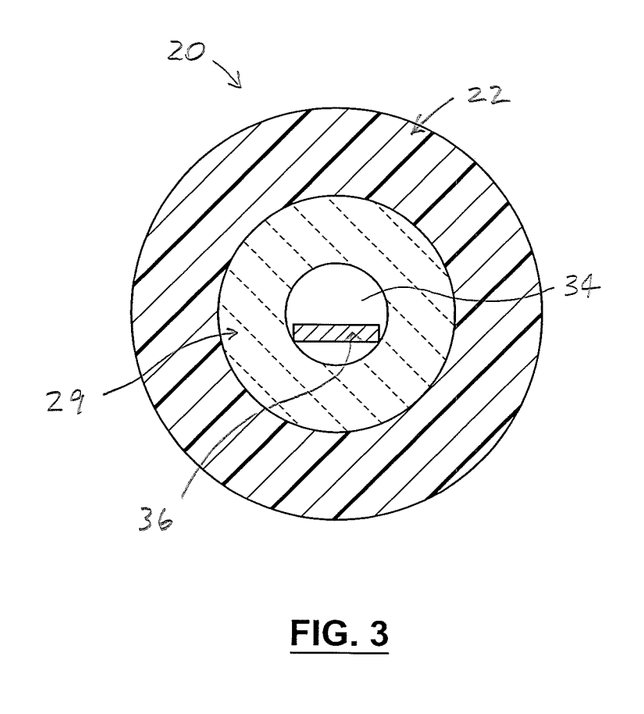
FIG. 3 is a cross-section of the ore tag assembly of FIG. 1A.

As can be seen in FIGS. 1A and 3, where the tube subassembly 28 includes two tubes, i.e., the inner tube 29 and the outer tube 22, the cavity 34 (in which the RFID device 36 is positioned) is at least partially defined by an inner surface 45 of the inner tube 29. Those skilled in the art would appreciate that the inner surface 45 may have any suitable shape. In one embodiment, the inner surface 45 preferably is generally circular in cross-section, thereby defining the cavity 34 as being substantially circular in cross-section (FIG. 3).

Preferably, the RFID device 36 is any suitable RFID device. Those skilled in the art would be aware of suitable RFID devices. In one embodiment, it is preferred that the RFID device 36 is a passive RFID device.

Figure 2:
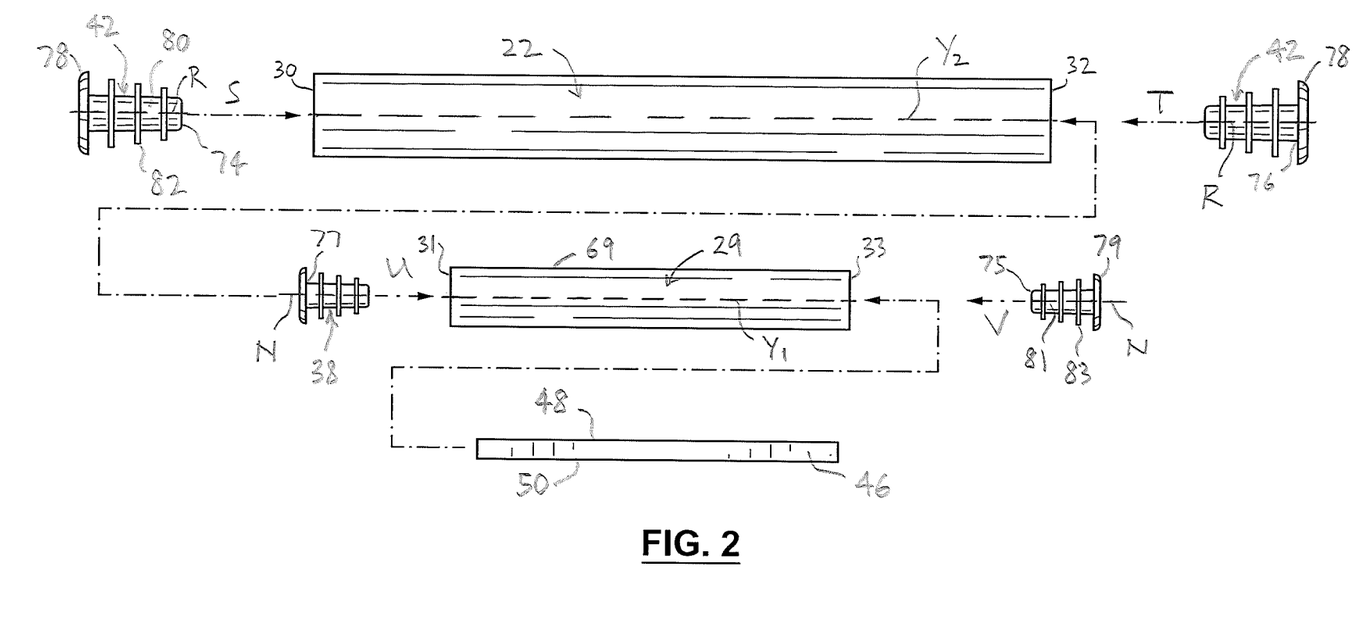
FIG. 2 is an exploded view of certain elements of the ore tag assembly of FIG. 1A, drawn at a smaller scale.

It is also preferred that the RFID device 36 includes an inlay (not shown) and a body portion 46 in which the RFID inlay is located, as is known in the art (FIGS. 1B, 2). The body portion 46 may be made of any suitable material and may have any suitable configuration, however, it is preferred that the body portion 46 is flexible and elongate, and has opposed first and second surfaces 48, 50 (FIG. 2). It will be understood that the thickness of the body portion 46 of the RFID device 36 is exaggerated as illustrated in FIGS. 1A-3, for clarity of illustration.

Alternatively, the RFID device 36 may be an active RFID device. In addition, those skilled in the art would appreciate that any suitable alternative form of electronic device may be substituted for the RFID device 36.

As an example, in a generally available RFID device, the body portion 46 of the RFID device 36 may be approximately 4 inches long and about 0.5 inch wide. The body portion 46 may also be about 0.020 inch thick.

It will be understood that the ore tag assembly 20 may have any suitable dimensions. As an example, to house the RFID device described above, the outer tube 22 may be approximately 6.5 inches long, and have an inner diameter of approximately 0.75 inch. The outer diameter may be approximately ⅞ inch. The inner tube 29 may be approximately 4.25 inches long, and have an outer diameter of approximately ⅝ inch and an inner diameter of approximately 0.5 inch.

Figure 7:
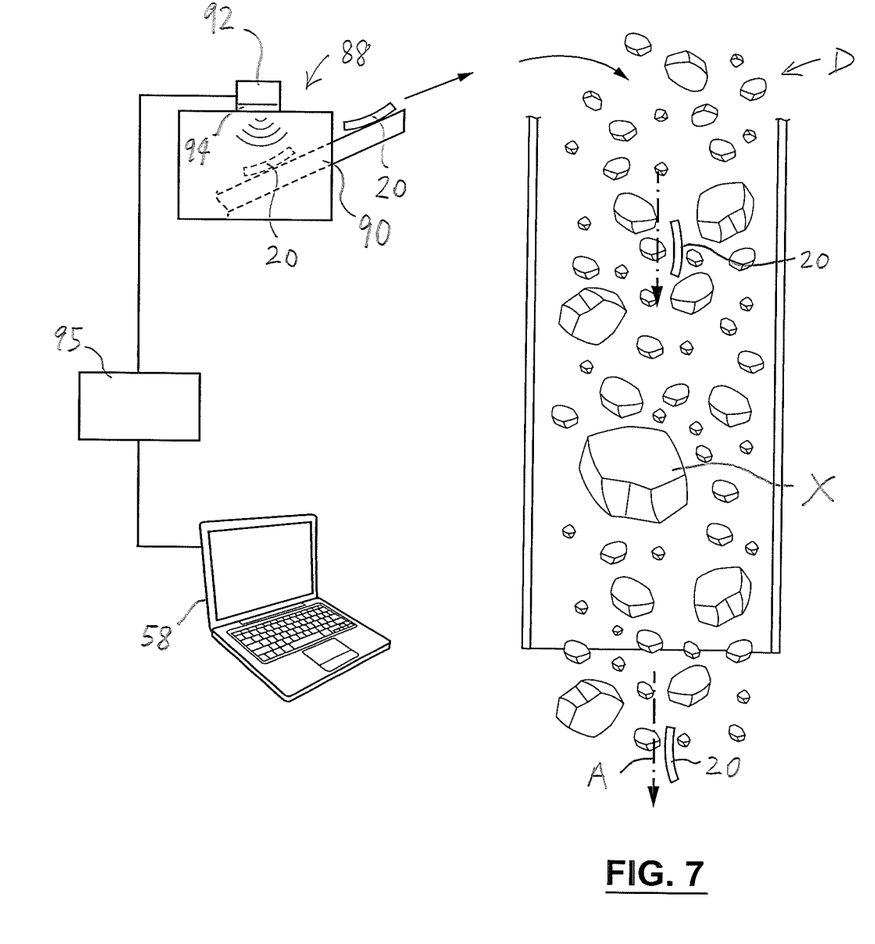
FIG. 7 is a schematic illustration of an embodiment of a distribution assembly of the invention.
Figure 8:
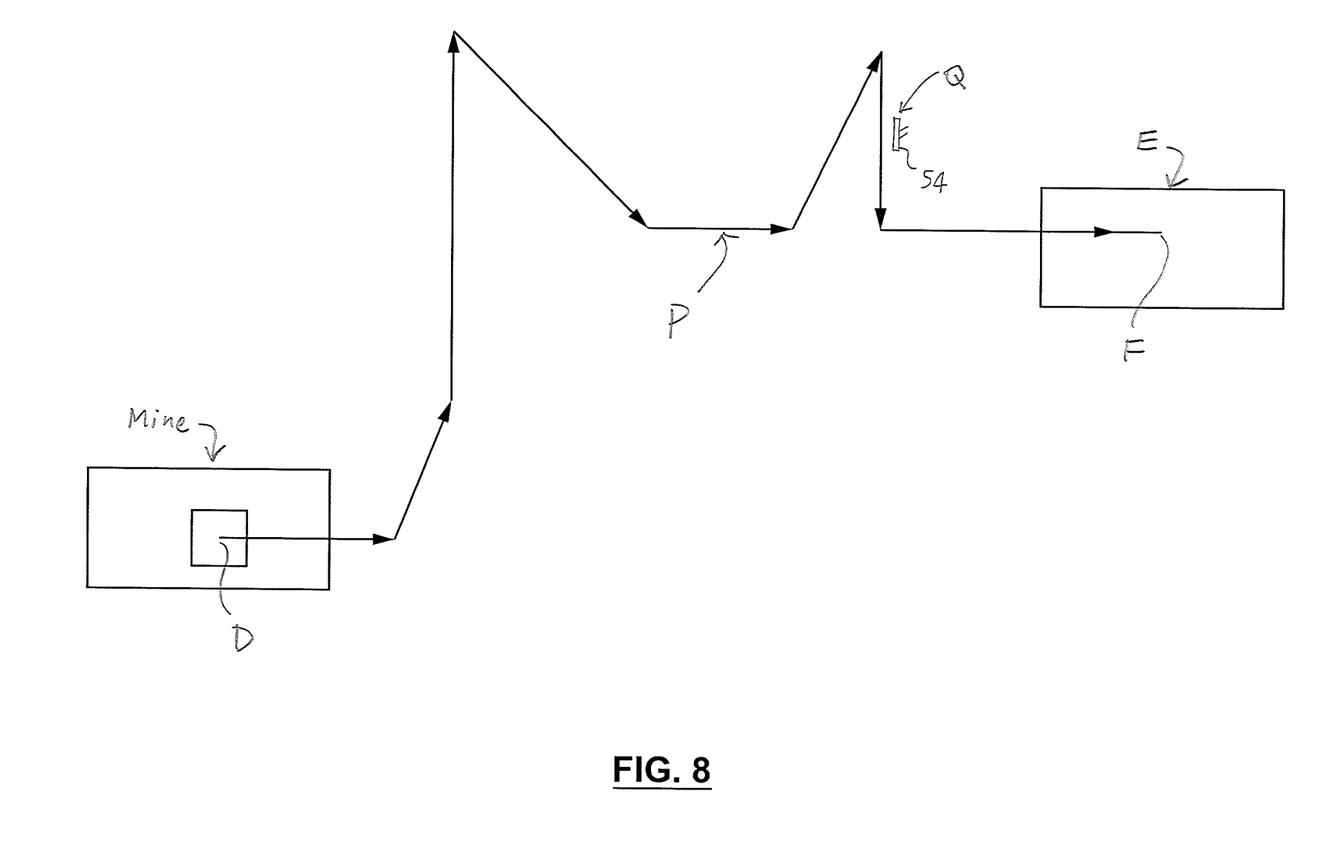
FIG. 8 is a schematic representation of a path taken by ore moved from a mine to a mill in which the ore is processed.

As will be described, in one embodiment, the ore tag assembly 20 preferably is released at a release location "D" into ore "X", or into any other material of interest (FIG. 7). For example, in the case of ore, the ore tag assemblies 20 may be released into the ore at a selected point in a mine (underground, or surface). As schematically illustrated in FIG. 8, the selected point of release "D" may be at or near a location from which the ore originates. It will be understood that the ore "X" may be moving (e.g., down a chute) or stationary when the ore tag assemblies 20 are released into the ore "X". Those skilled in the art would appreciate that, preferably, the ore tag assemblies 20 are released in concentrations relative to the ore so as to provide the data needed to achieve efficient operation of the mill, and the mine.

Those skilled in the art would appreciate that the ore is moved along a path "P" (schematically illustrated in FIG. 8) from originating location thereof, past the selected point of release "D" to a processing facility "E" (e.g., a mill), in which the ore is processed to remove waste therefrom, including the ore tag assemblies 20. In FIG. 8, the end of the path "P", at which the ore tag assemblies 20 are destroyed or otherwise disposed of, is identified by reference character "F". It will be understood that the path "P", as illustrated in FIG. 8, is only a schematic representation, intended to represent movement of the ore horizontally, vertically, and otherwise along the path "P", as may occur as the ore is moved to the mill. Those skilled in the art would appreciate that the path "P" may have any suitable configuration.

Those skilled in the art would also appreciate that, once the ore tag assemblies 20 are released into the ore, each ore tag assembly 20 is subjected to dynamic and also static loading by the ore, because the ore pieces move relative to each other as the ore is moved along the path to the mill "E", and press upon the ore tag assemblies 20 mixed with the ore, and located between the ore pieces. Unlike the prior art devices, however, the ore tag assemblies 20 are configured to bend without breaking, or to otherwise accommodate the compressive forces to which the ore tag assemblies 20 are subjected by the ore pieces among which the ore tag assemblies 20 are located, while the ore is moved along the path "P".

To minimize the cost of making the ore tag assembly 20, it is preferred that the components included in the ore tag assembly 20 are, to the extent feasible, commonly available components. For example, the relatively small and elongate RFID device 36 described above may be selected because it is readily available and also in a form (i.e., small, and elongate) that works well when the ore tag assembly 20 is located in the ore. As will be described, the cavity 34 preferably is configured so that the RFID device 36 is relatively loosely held in position by the inner surface 45. The inner tube 29 and the outer tube 22 preferably are formed from materials that are also commonly available. Accordingly, in one embodiment, the tubes 22, 29 preferably are circular in cross-section, as are the cavities therein. However, other configurations may also be suitable.

Preferably, the ore tag assembly 20 has a relatively small size. It is believed that the relatively high rate of survival of the ore tag assemblies 20 that are mixed with the ore may be partly due to their relatively small size. It will be understood that, preferably, after the ore tag assemblies 20 have been added into the ore "X" at the release location "D", the ore tag assemblies 20 are not removed from the ore before the ore is processed in the mill. Accordingly, the ore tag assemblies 20 are, in the mill "E", considered to be additional waste material, which ultimately is to be separated from the mineral or minerals of interest in the ore along with other waste material, as the ore is processed in the mill "E". This is feasible and is believed to be not particularly costly because the ore tag assemblies 20 are relatively small.

Preferably, the tube subassembly 28 is formed to bend in response to dynamic and static loading imposed on the tube subassembly 28 by the ore "X" as the ore is moved along the path "P". Accordingly, the tubes 22, 29 are flexible and resilient. In addition, the tubes 22, 29 preferably are movable relative to each other, to an extent.

As can be seen in FIGS. 1A, 1B, and 3, it is preferred that the cavity 34 is generally not filled by the RFID device 36. It is also preferred that the RFID device 36 is not secured to the inner wall 45, nor is the RFID device 36 secured to the inner plugs 38. The RFID device 36 is loosely held in the cavity 34. It is believed that the position of the RFID device 36, sealed inside the cavity 34 but not securely attached to the inner wall 45 or the inner plugs 38, is one important reason why the ore tag assembly 20 appears to be able to survive moving from the release point in the mine to the mill while the ore tag assembly 20 is in the ore pile that is moved, without serious damage to the RFID device 36. As will be described, the inner plugs 38 preferably are configured so that, when the ore tag assembly 20 is assembled, small gaps 65 are defined between the RFID device 36 and the inner plugs 38, at each end of the RFID device 36 respectively.

Also, because of the size and elongate shape of the cavity 34 and the size and corresponding elongate shape of the RFID device 36, the RFID device 36 is loosely held in the cavity 34 so that the RFID device 36 is generally parallel with a longitudinal axis "Y" (FIG. 1B) of the ore tag assembly 20. The cavity 34 is sufficiently small, in cross-section, that the RFID device 36 cannot overturn in the cavity 34, nor can the RFID device 36 become lodged in a position in which it would be generally non-aligned with the longitudinal axis "Y".

Due to the sealant 41, water or other liquids and dust are unable to enter into the cavity 34.

The cavity 34 is sufficiently large, in cross-section, that the inner and outer tubes 29, 22 may be subjected to significant bending before the inner surface 45 of the inner tube 28 may engage the RFID device 36. Accordingly, the relatively large internal cavity 34 cross-section area (relative to the cross-section area of the RFID device 36) is also believed to be important to the ability of the ore tag assembly 20 to survive significant impact and static loading by the ore, without impairing the functioning of the RFID device 36. In addition, even if the inner and outer tubes 29, 22 are bent so that the inner surface 45 pushes against the RFID device 36, because the RFID device 36 is positioned loosely in the cavity 34, the RFID device 36 moves with the inner surface 45 to an extent, in response to such engagement.

As can be seen in FIGS. 1A-1C, the cavity 34 preferably has a length "L" (FIG. 1B) that preferably is selected according to the length of the RFID device 36, so that the RFID device 36 is held only loosely in position inside the cavity 34. As noted above, it is preferred that the RFID device 36 is selected from those generally available, and it therefore will be understood that the inner tube 29 preferably is formed to receive the RFID device 36 in the cavity 34 lengthwise therein.

As can be seen in FIGS. 1A and 1B, in one embodiment, the length "L" preferably is selected so that there are the small gaps 65 between the RFID device 36 and the inner plugs 38, when the ore tag assembly 20 is assembled. It will be understood that the gaps 65 are exaggerated in FIGS. 1A-1C, for clarity of illustration. It is believed that, because of the gaps 65, impacts of ore pieces on the outer tube 22 of dynamic or static loading of the ore tag assembly 20 are less likely to be transferred to the RFID device 36, to decrease the likelihood that the RFID device 36 may be affected by such loading.

As noted above, the tube subassembly 28 preferably is constructed so that it will bend in response to dynamic and static loading imposed on the tube subassembly 28 by the ore "X", as the ore is moved along the path "P". The ore tag assemblies 20 appear to have a surprisingly high survival rate of over 90%. This is a survival rate that is higher than that of the prior art devices, in which, instead, a hard shell or housing was intended to withstand the impacts of the ore pieces. Because the ore tag assembly 20 is designed to bend rather than to resist the large forces imposed on it, the ore tag assembly of the invention may be said to be counter-intuitive, in view of the prior art.

The assembly of the ore tag assembly 20 is schematically illustrated in FIG. 2. It will be understood that the sealant 41 is omitted from FIG. 2 for clarity of illustration.

Those skilled in the art would appreciate that the ore tag assembly 20 may be assembled in other ways, in a different sequence of steps from those illustrated in FIG. 2, if desired.

In one embodiment, the ore tag assembly 20 is assembled, first, by inserting the RFID device 36 into the inner tube 29 (FIG. 2). Preferably, the inner plugs 38 are then inserted into the respective ends 31, 33 of the inner tube 29, as will be described. The inner tube 29, with the RFID device 36 inside the cavity 34 therein and the inner plugs 38 in the ends 31, 33, is then positioned in the outer tube 22.

The inner tube 29 is defined by a longitudinal axis identified by reference character "$Y_1$" in FIG. 2 for clarity of illustration. Also, a longitudinal axis of the outer tube 22 is identified by reference character "$Y_2$". The inner tube 29 is substantially coaxially aligned with the outer tube 22 before the inner tube 29 is inserted into the outer tube 22.

As can be seen in FIGS. 1A and 1B, in one embodiment, the outer tube 22 preferably is longer than the inner tube 29. In FIG. 1B, the outer tube's length is identified by the reference character "K". The outer tube 22 preferably includes an inner surface 66 that defines an outer tube cavity 68 extending between the first and second ends 30, 32 of the outer tube 22 (FIGS. 1A, 1C). In order for the inner tube 29 to fit loosely inside the outer tube 22, the outer tube's inner surface 66 and an outer surface 69 of the inner tube 29 (FIG. 2) preferably have compatible shapes and dimensions.

When the inner tube 29 is inserted into the outer tube 22, end portions 70, 72 of the outer tube 22 (i.e., portions of the outer tube extending beyond the inner tube 29) are defined, because the inner tube 29 is shorter than the outer tube 22. As can be seen in FIG. 1A, the outer tube 22 preferably includes an intermediate portion 73 that extends between the end portions 70, 72. Preferably, the inner tube 29 fits into the outer tube 22 easily, in a clearance fit. As will be described, it is preferred that the inner tube 29 is loosely held in place inside the intermediate portion 73 of the outer tube 22. It is preferred that the outer surface 69 of the inner tube 29 does not securely or tightly engage the inner surface 66 of the outer tube 22. Preferably, the outer surface 69 only lightly engages the inner surface 66, and may engage it only at certain locations along the intermediate portion 73.

After the inner tube 29 is positioned in the outer tube 22, the sealant 41 is positioned on the inner surface 66 of the end portions 70, 72 of the outer tube 22. The sealant 41 may be any suitable sealant. Preferably, the sealant 41 is a silicone sealant, which solidifies relatively quickly.

After the sealant 41 is in place, the plug elements 42 are inserted into the respective end portions 70, 72 of the outer tube 22. Those skilled in the art would appreciate that the sealant 41 is intended to provide a substantially watertight seal between the plug elements 42 and the inner surface 66 in each of the end portions, to provide a watertight seal, to keep water and other liquids, and dust, from entering the cavity 34. The plug elements 42 and the plugs 38 are also intended to prevent ingress of water and other liquids and materials (e.g., dust) into the cavity 34.

As can be seen in FIGS. 1C and 2, the inner plug 38 preferably is defined by an axis "N" thereof. The inner plug 38 extends between a first end 75 and a second end 77, and preferably includes a cap 79 located at the second end 77 (FIG. 1C). A body portion 81 extends between the cap 79 and the first end 75. The body portion 81 may have any suitable shape, however, it is preferred that the body portion 81 is generally tapered, and symmetric relative to the axis "N" thereof (FIG. 1C).

The inner plug 38 preferably also includes a number of flexible ribs 83 that extend radially outwardly from the body portion 81 (FIG. 1C, 2).

The inner plug 38 may be made of any suitable material. It is preferred that the inner plug 38 is made of a flexible and resilient material, e.g., light density polyethylene.

As noted above, the RFID device 36 is positioned in the cavity 34 in the inner tube 29. As illustrated in FIG. 2, the axes "N" of the inner plugs 38 preferably are then aligned with the longitudinal axis "$Y_1$" of the inner tube 29, and pushed into the respective ends 31, 33 of the inner tube 29, as indicated by arrows "U" and "V" respectively. It can be seen in FIG. 1C that, once the inner plug 38 is in place at the end 33 of the inner tube 29, an inner gap 65 is defined between the RFID device 36 and the first end 75 of the inner plug 38. The inner plug 38 is formed to define the inner gap 65, once the inner plug 38 is in place on the end 31, 33 of the inner tube 29, to ensure that the RFID device 36 is only loosely held in the cavity 34. Accordingly, the cap 79 is formed to act as a stop, to locate the first end 75 in the predetermined position for the first end 75 relative to the end 31, 33 of the inner tube 29, and also relative to the RFID device 36, to define the inner gap 65.

When the first end 75 of the inner plug 38 is pushed into the cavity 34 at the end 33 of the inner tube 29, the movement of the inner plug 38 in the direction indicated by arrow "T" in FIG. 2 is stopped when the cap 79 engages the end 33 of the inner tube 29 (FIG. 1C). It will be understood that, at the other end 31 of the inner tube 29, the movement of the first end 75 of the inner plug 38 in the direction indicated by arrow "S" stops when the cap 79 of the inner plug 38 being inserted into the cavity 34 at the end 31 engages the end 31.

The ribs 83 extend radially outwardly from the body portion 81, prior to insertion of the inner plugs 38 into the ends 31, 33. As can be seen in FIG. 1C, when the inner plug 38 is inserted into the end of the inner tube 29, the ribs 83 engage the inner surface 45, and are bent back as the inner plug 38 moves into the inner tube 29. Because they are resilient, the ribs 83 tend to hold the inner plug 38 securely in position, at the end of the inner tube 29.

As can be seen in FIGS. 1C and 2, the plug element 42 preferably is defined by an axis "R" thereof. The plug element 42 extends between a first end 74 and a second end 76, and preferably includes a cap 78 located at the second end 76 (FIG. 1C). A body portion 80 extends between the cap 78 and the first end 74. The body portion 80 may have any suitable shape, however, it is preferred that the body portion 80 is generally tapered, and symmetric relative to the axis "R" thereof (FIG. 1C).

The plug element 42 preferably also includes a number of flexible ribs 82 that extend radially outwardly from the body portion 80 (FIG. 1C, 2).

The plug element 42 may be made of any suitable material. It is preferred that the plug element 42 is made of a flexible and resilient material, e.g., light density polyethylene.

As can be seen in FIGS. 1B and 1C, the end portions 70, 72 of the outer tube 22 preferably define respective end parts 84, 86 of the outer tube cavity 68. After the inner plug 38 has been inserted into the second end 33 of the inner tube 29 to close the cavity 34, the sealant 41 is positioned on the inner surface 66 of end portions 70, 72 of the outer tube 22, and the plug elements 42 are partially inserted into the end portions 70, 72, to locate the body portion 80 and the ribs 82 in the end parts 84, 86 respectively.

As shown in FIG. 2, after the inner tube 29 (with the RFID device therein, and the inner plugs 38 in the ends 31, 33 thereof) has been inserted coaxially into the outer tube 22, the sealant 41 is positioned on the inner surface 66 of the end portions 70, 72, and the plug elements 42 are partially inserted into the end portions 70, 72, in the directions indicated by arrows "S" and "T" respectively.

At the end 30 of the outer tube 22, the first end 74 is pushed in the direction indicated by arrow "S" into the end part 84 of the outer tube cavity 68, with the axis "R" of the plug element 42 being substantially aligned with the axis "$Y_2$" of the outer tube 29, which at that point is also coaxial with the axis "$Y_1$" of the inner tube 29. Similarly, at the other end 32 of the outer tube 22, the first end 74 of the other plug element 42 is pushed in the direction indicated by arrow "T" into the end part 86 of the outer tube cavity 68, with the axis "R" of the plug element 42 being substantially aligned with the axis "$Y_2$" of the outer tube 22.

For clarity of illustration, reference is made to FIG. 1C. It will be understood that the end portions 70, 72 are the same in all relevant respects, and only the end portion 72 is illustrated in FIG. 1C for clarity of illustration.

As can be seen in FIG. 1C, as the body portion 80 is pushed into the end part 86, the ribs 82 partially engage the inner surface 66 in the end portion 72 of the outer tube 22, and the ribs 82 are consequently deformed. The ribs 82 are shown in the deformed condition in FIGS. 1A-1C. As can be seen in FIG. 1C, the sealant 41 tends to be located generally (but not necessarily completely) between the deformed ribs 82.

The ribs 82 preferably are made of any suitable elastomeric material, so that the deformed ribs 82 tend to push outwardly from the axis "R" against the inner surface 66, to hold the plug element 42 in place (FIG. 1C) in the end portions 70, 72 of the outer tube 22.

In FIGS. 1C and 2, it can be seen that the cap 78 preferably acts as a stop, i.e., when the cap 78 engages the end 32 of the tube 22, further movement of the first end 74 of the plug element 42 inwardly (i.e., in the direction indicated by arrow "T") is prevented by the cap 78. The plug element 42 preferably is formed so that, when the cap 78 engages the end 30, 32 of the outer tube 22, the first end 74 of the plug element 42 is positioned in a preselected position relative to the end 32 to define an outer gap 85 between the first end 74, and the cap 79 of the inner plug 38. That is, the plug element 42 may be formed so that, when the plug element 42 has been inserted and its cap 78 prevents further movement of the plug element 42 toward the inner tube 29, the cap 78 locates the first end 74 in the preselected position thereof, spaced apart from the inner plug 38 by the outer gap 85, so that the first end 74 is located to define the outer gap 85.

It will be understood that, at the other end 30 of the outer tube 22, movement of the first end 74 of the plug element 42 in the direction indicated by arrow "S" in FIG. 2 (i.e., into the cavity 68 toward the end 31 of the inner tube 29) is stopped by engagement of the cap 78 with the end 30 of the outer tube 22, to locate the first end 74 in a preselected position, to define the outer gap 85 between the first end 74 of the plug element 42 and the cap 79 of the inner plug 38.

The plug elements 42 are held in the respective end portions 70, 72 by the engagement of the ribs 82 with the inner surface 66 of the outer tube 22, and to an extent by the sealant 41 in the preselected position inside the outer tube 22, defining the gaps 85 between the plug elements 42 and the respective inner plugs 38 proximal thereto.

The gaps 65, 85 are believed to enable the components of the ore tag assembly 20 to have a limited ability to move relative to each other. In this way, because the ore tag assembly 20 is constructed to define the gaps 65, 85 therein, the components thereof are free to bend, and otherwise to move relative to each other, to somewhat absorb the dynamic and static loading to which the ore tag assembly 20 is subjected by the ore. Accordingly, the gaps 65, 85 are believed to help the ore tag assembly 20 survive the loading to which it is subjected as the ore tag assembly 20 is moved along the path "P", among the ore pieces. It will be understood that, as illustrated in FIGS. 1A-1C, the sizes of the gaps 65, 85 are somewhat exaggerated, for clarity of illustration.

As noted above, the RFID device 36 preferably has an elongate body portion 46, and it is preferred that the RFID device 36 is positioned in the cavity 34 so that it is lying generally on, or partly engaged with, the inner surface 45 of the inner tube 28, with the body portion 46 extending along almost the entire length thereof, substantially parallel with the longitudinal axis "Y" (FIG. 1A). As is also noted above, the RFID device 36 preferably is not secured to the inner surface 45, but instead is loosely positioned in the cavity 34. This is also believed to be important for the survival and functioning of the RFID device 36 as the ore tag assembly 20 is moved, along with the moving ore "X", along the path "P" toward the mill, because the impacts of dynamic and static loading to which the outer tube 22 is subjected by the ore (i.e., as the ore is moved, with the ore tag assembly 20 positioned in the ore) preferably are not transmitted directly from the outer tube 22 to the RFID device 36.

From the foregoing, it can be seen that the ore tag assembly 20 preferably is constructed so that different components thereof may separately respond (e.g., by bending) to such dynamic or static loading as the ore tag assembly 20 is subjected to, by the ore. For example, if a piece of ore (not shown) pushes against the outer tube 22 as indicated by arrow "C", the initial response would be for the outer tube 22 to deflect in the direction indicated by arrow "C" (FIG. 1B). Because the inner tube 29 is not directly secured to the outer tube 22, it is possible that the deflection of the outer tube 22 may occur without deflection of the inner tube 29, to an extent. However, if the force directed as indicated by arrow "C" is sufficiently large, then the outer tube 22 deflects sufficiently that its inner surface 66 engages the outer surface 69 of the inner tube 29. Depending on the force applied against the ore tag assembly 20, the inner tube 29 may also deflect sufficiently (i.e., due to its engagement by the outer tube 22) that the inner surface 45 of the inner tube 29 may engage the RFID device 26. Based on the testing done to date, however, this appears to be unlikely, or at least rare.

As noted above, the inner plugs 38 and the plug elements 42, and the sealant 41, are intended to protect the RFID device 36 from engagement with water or other liquids or mixtures that may be included in the ore, or added to the ore, or from dust.

It will be understood that the ore tag assembly 20 may have a different structure, or may be assembled in other ways. For instance, the tube subassembly 28 may include only one tube, or it may include more than the two tubes 22, 29 that are illustrated in FIGS. 1A-3. Alternatively, the assembly process may commence with positioning the RFID device 36 inside the cavity 34 therein, and the sealant onto the ends of the tube, to seal the cavity. The inner tube may then be inserted into the outer tube.

It will also be understood that the ore tag assemblies 20, once assembled, may be distributed in any manner that is appropriate in the circumstances. In general, the ore tag assemblies 20 preferably are respectively individually identified by radio frequency identity thereof immediately prior to release, and then distributed or released at one or more convenient release locations (for example, transfer points, and/or storage locations) that will enable specific ore tag assemblies 20 to be identified as having been released at specific release locations "D". The release locations may be selected so that they are respectively associated with certain originating locations of the ore (e.g., slopes, in an underground mine). In this way, when the ore tag assemblies 20 are subsequently read, the respective originating or initial locations of the ore in which the ore tag assemblies 20 are positioned can be known (based on the release locations), and the user can make appropriate adjustments in the feed to the mill, or to the processes in the mill, for optimal ore processing. Those skilled in the art would be aware of suitable adjustments, the details of which would vary from one mine and mill to another. For example, if the ore about to enter the mill is from a location in the mine that is known to have an unusually high percentage of a valuable mineral, then the processes in the mill may be adjusted slightly, to optimize the processing of such ore.

Those skilled in the art would appreciate that the ore tag assemblies 20 may also be used in industries other than mining, to enable an operator (not shown) to optimize processes based on the originating locations of different materials that are fed to a processing facility, or to adjust the feed of the materials to the processing facility. Alternatively, the ore tag assemblies 20 may be used simply to track the progress of any particular material through a facility, for example, to identify any unusual delays in the movement of the material through the facility.

Figure 6:
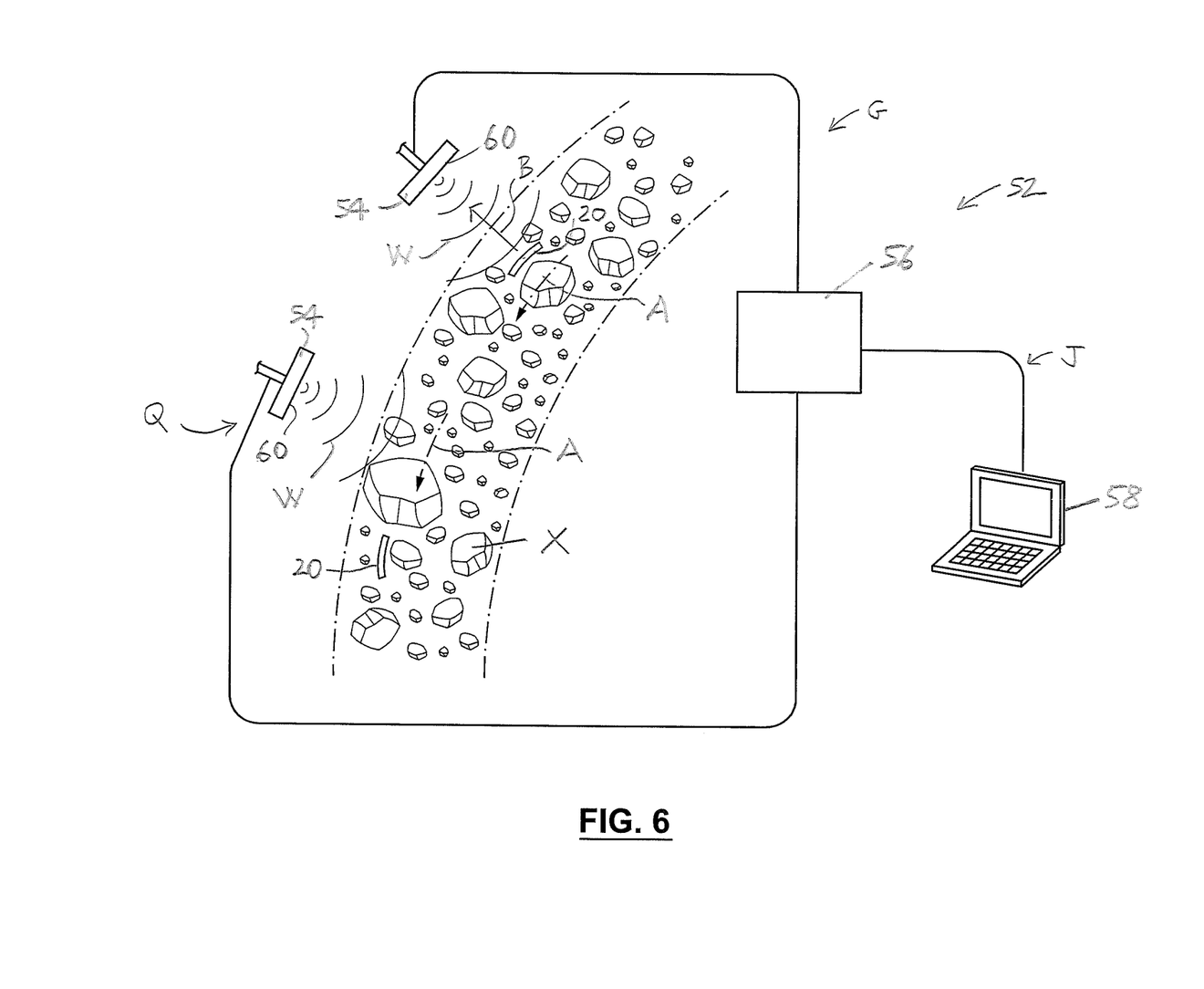
FIG. 6 is a schematic illustration of an embodiment of a system of the invention.

The invention preferably includes a system 52 including one or more reader subassemblies "G" (FIG. 6). The reader subassembly "G" preferably includes one or more readers 56 for generating an initial signal to which the RFID device is responsive, and for reading a response signal generated by the RFID device 36 in a nearby ore tag assembly 20 in response to the initial signal, the response signal having location data identifying the RFID device and the location of the RFID device on the path "P". The reader subassembly "G" preferably also includes one or more antennas 54 for directing a radio wave to the RFID device, to transmit the initial signal to the RFID device 36, and for receiving the response signal from the RFID device 36. The system 52 preferably also includes a processor 58, for processing the location data, to determine the location of the RFID device 36 and the identity of the RFID device 36 when the response signal is transmitted to the antenna 54. It is also preferred that the system 52 includes a transmission subassembly "J", for transmitting the location data to the processor 58.

As can be seen in FIG. 6, in the system 52, the ore assembly 20 (i.e., the RFID device 36 therein) provides the data that may be utilized as described above. In one embodiment, the system 52 preferably includes one or more antennas 54 operatively connected with one or more RFID readers 56 (FIG. 6). As schematically illustrated in FIG. 6, the RFID reader 56 preferably is operatively connected with one or more processors or computers 58, to enable the operator to analyze and use the data provided by the RFID devices 36 to take appropriate action.

Those skilled in the art would appreciate that the data may be stored and processed in any suitable manner. For instance, in one embodiment, the data may be stored locally on the reader 56. The data may be transferred to the processor via a network connection (FIG. 6), or the data transfer may be effected by downloading the data to a portable storage device (e.g., a USB stick), and then transferring the data to the processor 58. For convenience, the hardware and software utilized for transferring data to the processor(s) 58 are collectively identified in FIG. 6 as the transmission subassembly "J".

As is known in the art, the passive RFID devices 36 in the ore tag assemblies 20 respond to a signal from the reader 56, in the form of a radio wave directed from the antenna 54. The reader 56 sends electrical energy to the antenna 54, at which the energy is converted to an electromagnetic wave that is directed into the zone through which the RFID devices 36 (i.e., included in the respective ore tag assemblies 20) are intended to move. The RFID devices 36 respond to the initial radio frequency wave from the antenna with a responding signal back (i.e., backscatter) to the antenna 54.

Preferably, the antenna 54 includes a surface 60 that is in the form of a substantially flat element, and as illustrated, the surface 60 is generally square.

Alternatively, the RFID device 36 may be an active RFID device. Because active RFID devices are well known in the art, it is unnecessary to describe the functioning of these RFID devices in further detail.

Those skilled in the art would appreciate that any suitable form of antenna may be used. It will be understood that the antennas illustrated include substantially flat surfaces 60 for exemplary purposes only.

Figure 4:
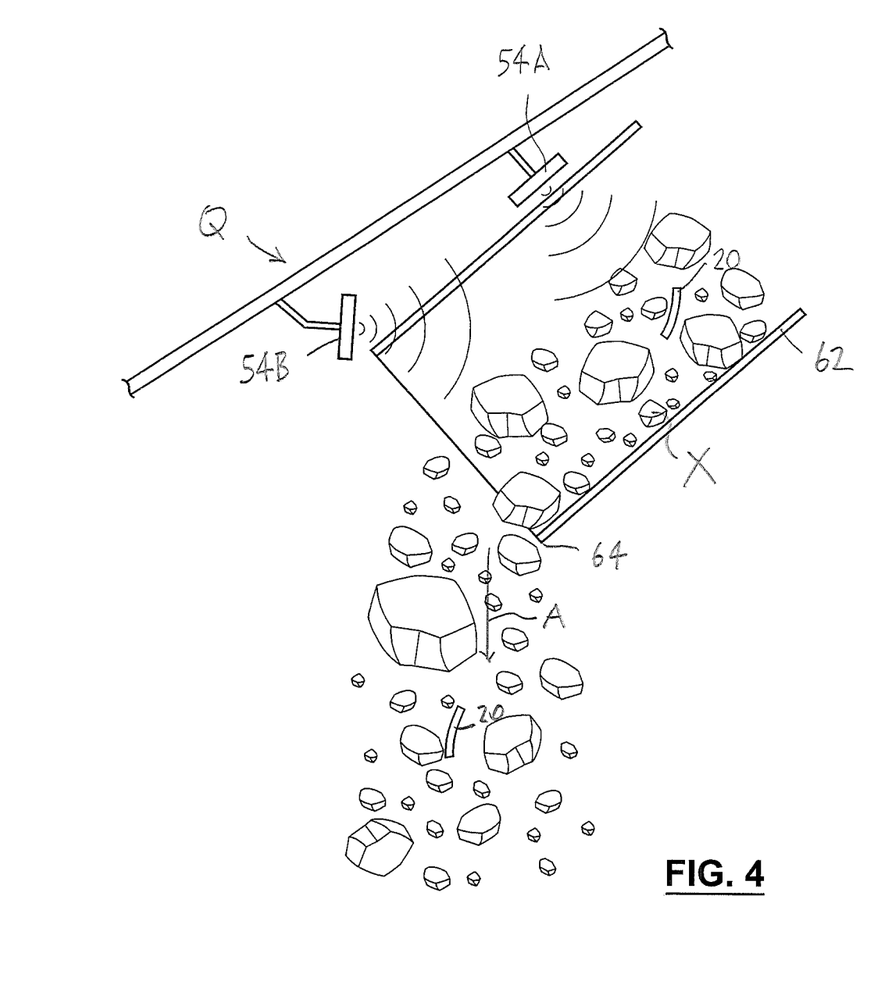
FIG. 4 is a side view showing utilization of the ore tag assemblies in ore moving down a chute, drawn at a smaller scale.
Figure 5:
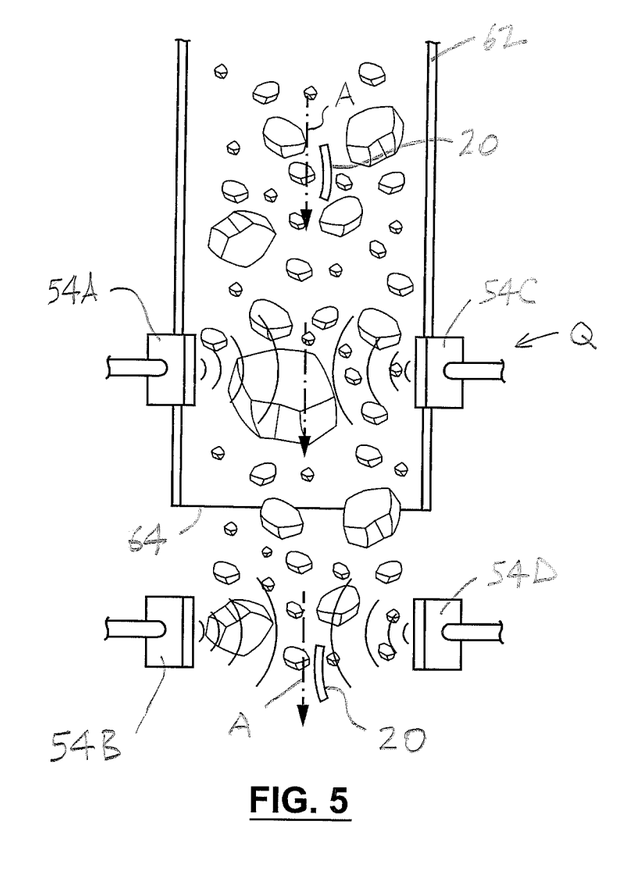
FIG. 5 is top view of the chute of FIG. 4, and the ore and the ore tag assemblies moving down the chute.

As is known, the radio wave directed from the antenna 54 preferably is initially generally directed orthogonally to the surface 60 (FIGS. 4-6). Similarly, the responding signal generated by the RFID device 36 tends to be directed generally orthogonally to the first surface 48 of the body portion 46 of the RFID device 36, or the second surface 50, as the case may be. Those skilled in the art would appreciate that, in order for the strongest signal to be received by the antenna 54 from the RFID device 36, the first surface 48 or the second surface 50 of the body portion 46 is positioned substantially parallel to the surface of the antenna 54.

Accordingly, it is preferred that the antennas 54 are positioned, relative to the ore "X" moving past the antennas 54 and the ore tag assemblies 20 located in the ore, for optimal signal transmission and reception. Those skilled in the art would appreciate that the positioning of the antennas 54 relative to the moving stream of the ore "X" in which the ore tag assemblies 20 are located is generally approximate, and based on estimated positions of the ore tag assemblies 20 in the ore "X" as they move past the antennas 54. As a practical matter, however, the positions of the ore tag assemblies 20 in moving ore "X" is generally not known in advance, as such positions may be generally random. Also, the configurations of the antennas would need to be considered in determining their respective positioning.

The antennas 54 may be positioned at any suitable locations. Those skilled in the art would appreciate that the system 52 may be configured to include any suitable number of antennas 54. For example, the antennas 54 may be located proximal to a conveyor moving the ore thereon, positioned so that the radio waves emitted thereby are receivable by the RFID devices 36 in the ore tag assemblies 20 that are buried in the ore on the conveyor (FIG. 6). In the example illustrated in FIG. 6, the ore "X" may be moved by a conveyor (not shown), and two antennas 54 are positioned to direct electromagnetic waves "W" to the ore tag assemblies 20 that are buried in the ore "X", or positioned on the ore "X". The direction of the movement of the ore "X" is indicated by arrows "A". The two ore tag assemblies illustrated in FIG. 6 as being located in or on the moving ore "X" are identified by the reference numeral 20.

In use, it has been found that the ore tag assembly 20 generally tends to survive the impact loading and other loading to which the ore tag assembly 20 is subjected during movement of the ore, and accordingly the data obtained in the system 52 using a number of the ore tag assemblies 20 can be very useful. It is believed that the high survival rate of the ore tag assemblies 20 is due to, among other things, the flexibility of the inner tube 29 and the outer tube 22. It is also believed that the ability of the outer tube 22 and the inner tube 29 to move and bend independently of each other along most of their lengths also helps the ore tag assembly 20 survive its movement while embedded in the ore "X".

As noted above, it is also believed that the manner in which the RFID device 36 is loosely held inside the cavity 34 is another reason why the ore tag assemblies 20 generally appear to successfully survive the journey from a location in the mine to the mill, mixed in with the moving ore "X". Because the RFID device 36 is loosely held in the cavity 34, the bending, squeezing, and twisting to which the outer and inner tubes 22, 29 are subjected as the ore is transported generally does not result in corresponding bending or twisting of the RFID device 36, at least not to the same extent.

It will be understood that FIG. 6 may alternatively be seen as schematically illustrating a substantially vertical movement of the ore "X", i.e., a free fall movement, under the influence of gravity. As described below, locating antennas 54 at a location on the path "P" where the ore (with the ore tag assemblies 20 in it) is allowed to fall freely may be advantageous.

In FIG. 6, one of the ore tag assemblies 20 is illustrated as directing backscatter therefrom (schematically represented by arrow "B") toward the antenna 54 closest to it.

Those skilled in the art would appreciate that, depending on the extent to which the ore tag assemblies 20 are buried in the ore "X", the ore may interfere with communications between the antenna 54 and the ore tag assemblies 20. This may happen, for example, when the ore tag assemblies 20 are located in the ore positioned on a horizontal or non-horizontal conveyor belt, or where the ore is carried in a container (e.g., a skip). In these circumstances, although the antennas 54 may be positioned proximal to the ore, the ore may interfere with the transmission and reception of signals by the RFID devices in the ore tag assemblies 20. Accordingly, in one embodiment, the antennas 54 preferably are positioned to read the ore tag assemblies 20 when the ore (and the ore tag assemblies with the ore) are in free fall, due to gravity. Those skilled in the art would also appreciate that such movement of the ore may occur at one or more transfer points as the ore is moved along the path "P" to the mill.

Examples of how the antennas 54 may be positioned to read the ore tag assemblies 20, when the ore in which the ore tag assemblies 20 are located is vertically moved under the influence of gravity, are illustrated in FIGS. 4 and 5. In FIGS. 4 and 5, the antennas are identified by reference characters 54A-54D for convenience. They are positioned above a chute 62 down which the ore "X" moves, with the ore tag assemblies 20 being located in the ore. The direction of movement of the ore is indicated by arrow "A". At a lip 64 of the chute 62, the ore is not supported by the chute 62, and once past the lip 64, the ore "X" moves generally vertically downward under the influence of gravity.

Each of the antennas 54A-54D is energized to direct electromagnetic waves "W" therefrom. While the ore and the ore tag assemblies 20 in it are falling, the ore pieces tend to separate somewhat from each other, and this permits consistent receipt of signals by the ore tag assemblies 20, and consistent transmission of signals from the ore tag assemblies 20 as a result. It is believed that, when the antennas 54 are positioned to locate the ore tag assemblies 20 that are in the ore "X" that is falling, data is obtainable from all, or substantially all, of the ore tag assemblies 20 in the falling ore "X".

The antennas 54 are located at one or more preselected second locations "Q" on the path "P", downstream in the path from the release locations "D" (FIGS. 4-8).

In an alternative embodiment of the system 52, the system 52 preferably includes one or more distribution subassemblies 88 for distributing the ore tag assemblies 20 into the ore (FIG. 7). In one embodiment, the distribution subassembly 88 preferably includes a release device 90, for releasing one or more selected ones of the ore tag assemblies 20 into the ore at the preselected release location "D" on the path "P".

It is also preferred that the distribution subassembly 88 includes a release reader subassembly 92 for generating an initial release signal upon release of the selected one or more of the ore tag assemblies 20, at the preselected location "D".

The RFID device (not shown in FIG. 7) in the selected one or more of the ore tag assemblies is responsive to the initial release signal. Preferably, in response, the RFID device generates a response release signal that is read by the release reader subassembly 92. It is preferred that the response release signal includes release data that identifies the RFID device and also the preselected release location "D". The release reader subassembly 92 preferably also includes an antenna 94 for directing a first radio wave to the RFID device in the selected one or the ore tag assemblies upon the release there, and for receiving the response release signal therefrom.

The distribution subassembly 88 preferably also includes a release data transmission subassembly 95 for transmitting the release data to the processor 58. The release data transmission subassembly 95 may be any means for transmitting the release data to the processor 58.

Those skilled in the art would appreciate that the ore tag assemblies 20 preferably are identified by the release reader subassembly 92, prior to release thereof into the ore at the release location "D", one at a time. The release device 90 may be any suitable device, e.g., it may be a device that allows the ore tag assemblies 20 to fall into the ore "X" at the location "D" under the influence of gravity.

It will be understood that the distribution subassembly 88 may be activated on any suitable basis. For instance, the distribution subassembly 88 may be controllable remotely, to be activated when ore is located nearby in a location at which the ore tag assemblies 20 may be released into the ore. Alternatively, the distribution subassembly 88 may be activated automatically, e.g., once over a certain time period, or manually.

It will be understood that the system 52 may include a number of distribution subassemblies 88, located at a number of selected release locations "D". Preferably, release locations "D" are selected to provide information about ore obtained from particular originating locations thereof, as described above.

From the foregoing, it can be seen that the ore tag assembly 20 provides surprising, and counter-intuitive, results. It appears that, because the tube subassembly 28 is configured to bend when subjected to dynamic and static loading by the ore, and because the RFID device 36 is loosely held in the tube subassembly 28, in most of the ore tag assemblies 20, the RFID device 36 is not damaged by the ore.

In one embodiment, the invention provides a method of determining a source location from which ore originates. The method includes providing a number of ore tag assemblies. The ore tag assemblies are distributed in the ore "X" at one or more preselected first (release) locations "D" on the path "P" from the source location to a mill. When the ore tag assemblies are distributed in the ore at the one or more preselected first locations "D" on the path "P", release data identifying the distributed ore tag assemblies, and identifying the one or more preselected first (release) locations "D" at which the distributed ore tag assemblies are respectively distributed, is generated. One or more reader subassemblies are provided, located at preselected locations on the path "P" downstream from the one or more preselected release locations "D". With the reader subassembly, location data identifying the RFID devices in the ones of the ore tag assemblies that are present at the preselected second location, and identifying the preselected second location is obtained. The processor 58 is provided, for processing the release data and the location data to determine the source of the ore at the preselected second location.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

We claim:

1. An ore tag assembly comprising:
   at least one tube subassembly comprising:
      a flexible outer tube extending between first and second ends thereof;
      a flexible inner tube received in the outer tube, the inner and outer tubes being unsecured to each other to permit movement of the inner tube and the outer tube relative to each other, the inner tube extending between first and second ends thereof, the inner tube comprising an inner surface defining a cavity in the inner tube;
   an elongate RFID device loosely positioned in the cavity, the RFID device being unsecured to the inner surface, to permit movement of the RFID device relative to the inner surface; and
   plug elements positioned in the respective first and second ends of the outer tube and inner plugs positioned in the respective first and second ends of the inner tube, to prevent ingress of liquids and materials into the cavity.

2. An ore tag assembly according to claim 1 in which sealant is positioned in the respective first and second ends of the outer tube to provide seals between the respective plug elements and the outer tube at the first and second ends thereof, and in which sealant is positioned in the respective first and second ends of the inner tube to provide seals between the respective inner plugs and the inner tube at the first and second ends thereof.

3. An ore tag assembly according to claim 1 in which:
   each of the inner plugs extends between a first end and a second end thereof and comprises a cap located at the second end; and
   the inner plugs are formed to define respective inner gaps between the first ends thereof and the RFID device, when the inner plugs are respectively positioned in the first and second ends of the inner tube.

4. An ore tag assembly according to claim 3 in which:
   each of the plug elements extends between a first end and a second end thereof and comprises a cap located at the second end; and
   the plug elements are formed to define respective outer gaps between the first ends thereof and the caps of the inner plugs, when the plug elements are respectively positioned in the first and second ends of the outer tube.

5. An ore tag assembly according to claim 1 in which the inner surface is circular in cross-section and the cavity is circular in cross-section, and the RFID device has a width that is less than a diameter of the cavity.

6. An ore tag assembly according to claim 1 in which:
   the outer tube is defined by an outer tube longitudinal axis thereof;
   the inner tube is defined by an inner tube longitudinal axis thereof;

the inner tube is positioned in the outer tube coaxial with the outer tube, wherein the axes of the inner and outer tubes define a longitudinal axis of the ore tag assembly; and the RFID device is parallel with the longitudinal axis of the ore tag assembly.

7. A system comprising:

at least one ore tag assembly positionable in ore that is movable along a path, said at least one ore tag assembly comprising:

at least one tube subassembly comprising:

a flexible outer tube extending between first and second ends thereof;

a flexible inner tube received in the outer tube, the inner and outer tubes being unsecured to each other to permit movement of the inner tube and the outer tube relative to each other, the inner tube extending between first and second ends thereof, the inner tube comprising an inner surface defining a cavity in the inner tube;

an elongate RFID device loosely positioned in the cavity, the RFID device being unsecured to the inner surface, to permit movement of the RFID device relative to the inner surface;

plug elements positioned in the respective first and second ends of the outer tube and inner plugs positioned in the respective first and second ends of the inner tube, to prevent ingress of liquids and materials into the cavity;

at least one reader subassembly, comprising:

at least one reader for generating an initial signal to which the RFID device is responsive, and for reading a response signal generated by the RFID device in response to the initial signal, the response signal comprising location data identifying the RFID device and a location of the RFID device on the path;

at least one antenna for directing a radio wave to the RFID device, to transmit the initial signal to the RFID device, and for receiving the response signal from the RFID device;

a processor, for processing the location data, to determine the location of the RFID device and the identity of the RFID device when the response signal is transmitted to said at least one antenna; and a transmission subassembly, for transmitting the location data to the processor.

8. The system according to claim 7 comprising a plurality of ore tag assemblies and additionally comprising at least one distribution subassembly for distributing the ore tag assemblies, said at least one distribution subassembly comprising:

a release device, for releasing at least a selected one of the ore tag assemblies into the ore at a preselected release location on the path;

a release reader subassembly, comprising:

a release reader for generating an initial release signal upon release of the selected one of the ore tag assemblies at the preselected release location, to which the RFID device in the selected one of the ore tag assemblies is responsive, and for reading a response release signal generated by the RFID device in response to the initial release signal, the response release signal comprising release location data identifying the RFID device and the preselected release location;

a release antenna for directing a first radio wave to the RFID device in the selected one of the ore tag assemblies upon the release thereof, and for receiving the response release signal therefrom; and     a release data transmission subassembly for transmitting the release location data to the processor.

9. A method of determining a source location from which ore originated, the method comprising:

(a) providing a plurality of ore tag assemblies, each said ore tag assembly comprising:

a flexible outer tube extending between first and second ends thereof;

a flexible inner tube received in the outer tube, the inner and outer tubes being unsecured to each other to permit movement of the inner tube and the outer tube relative to each other, the inner tube extending between first and second ends thereof, the inner tube comprising an inner surface defining a cavity in the inner tube;

an elongate RFID device loosely positioned in the cavity, the RFID device being unsecured to the inner surface, to permit movement of the RFID device relative to the inner surface;

plug elements positioned in the respective first and second ends of the outer tube and inner plugs positioned in the respective first and second ends of the inner tube, to prevent ingress of liquids and materials into the cavity;

(b) distributing the ore tag assemblies in the ore at one or more preselected first locations on a path from the source location to a mill;

(c) when the ore tag assemblies are distributed in the ore at the one or more preselected first locations on the path, generating release data identifying the distributed ore tag assemblies, and identifying the one or more preselected first locations at which the distributed ore tag assemblies are respectively distributed;

(d) providing at least one reader subassembly, located at a preselected second location on the path downstream from the one or more preselected first locations;

(e) with said at least one reader subassembly, obtaining location data identifying the RFID devices in the ones of the ore tag assemblies that are present at the preselected second location, and identifying the preselected second location; and (f) providing a processor, for processing the release data and the location data to determine the source location of the ore at the preselected second location.

10. A method according to claim 9 in which the preselected second location is proximal to a transfer point on the path at which the ore is allowed to free fall, under the influence of gravity.

* * * * *